July 28, 1964 P. H. GRANBY 3,142,489

BALANCE ARMS FOR RECORD PLAYERS

Filed July 1, 1960 2 Sheets-Sheet 1

Inventor
P. H. Granby
By Holcombe, Wetherill & Brisebois
Attorneys

July 28, 1964 P. H. GRANBY 3,142,489

BALANCE ARMS FOR RECORD PLAYERS

Filed July 1, 1960 2 Sheets-Sheet 2

*Inventor*

*By*

*Attorney*

United States Patent Office 3,142,489

Patented July 28, 1964

3,142,489
BALANCE ARMS FOR RECORD PLAYERS

Peter Hugh Granby, Rainham, England, assignor to The Magnavox Electronics Company Limited Filed July 1, 1960, Ser. No. 40,406
Claims priority, application Great Britain July 7, 1959
4 Claims. (Cl. 274—10)

Automatic record changing gramophones of the kind in which a stack of records to be played is supported on a vertical magazine spindle projecting upwards from the center of the turntable, commonly have a balance arm which rests on top of the stack of records to keep them substantially horizontal.

One form of such balance arm is fixed to a vertical spindle which is carried in a support beside the turntable. The spindle is rotatable in the support to enable the arm to be swung clear when records are placed on the magazine spindle and is also able to slide up and down in the support so that the balance arm can move downwards and remain in contact with the top record on the stack as successive records are fed from the bottom of the stack on to the turntable thus causing the remainder of the stack to move downwards.

Because of this freedom of movement there is a tendency for the balance arm to move about uncontrollably when the gramophone is moved, particularly when it is in transit from the makers. Unless the gramophone is very carefully packed damage may result.

The purpose of the present invention is to enable the balance arm of the gramophone to be very easily fixed in position whenever this is necessary.

According to the present invention, in an automatic record changer which has a base plate and a balance arm fixed on a vertical spindle which is rotatably and slidably mounted in a support fixed to the base plate, the spindle has a lateral projection which engages in a guide slot in the support or a part fixed to the support, the projection being movable by rotation of the balance arm into a recess communicating with the slot where it is held by resilient means to hold the balance arm in a fixed position.

Preferably, the recess communicates with the lower end of the guide slot and the spindle is acted upon by a spring, which forms the resilient means, as it approaches the lower end of the guide slot. The projection is movable into the recess after the spindle has been moved downwards against the action of the spring and the projection is then firmly held in position in the recess by the upward push of the spring upon the spindle. The spring may be a coiled compression spring which surrounds the spindle. In this case the lower end of the spring presses against a fixed abutment and the upper end of the spring is arranged to act on the spindle when the spindle is pushed downwards.

An example of an automatic record changer having a balance arm constructed in accordance with the invention is illustrated in the accompanying drawings in which.

Figure 1:
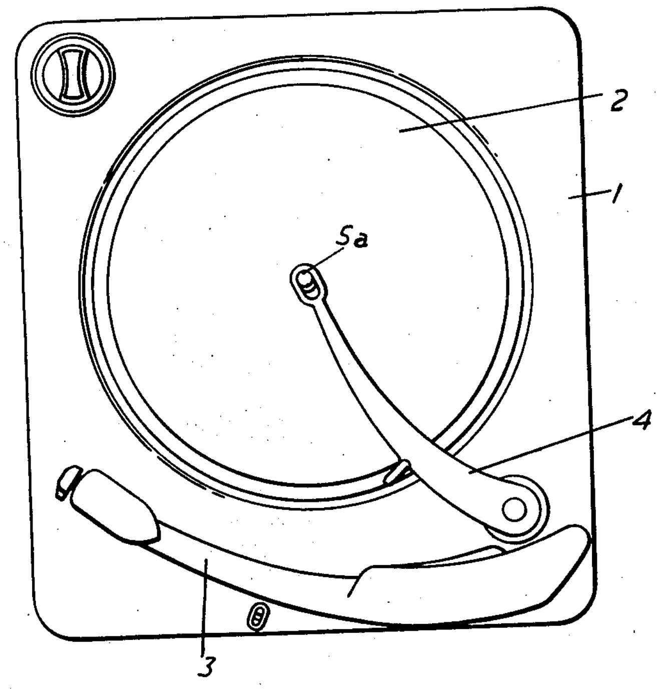
FIGURE 1 is a plan of the record changer.
Figure 2:
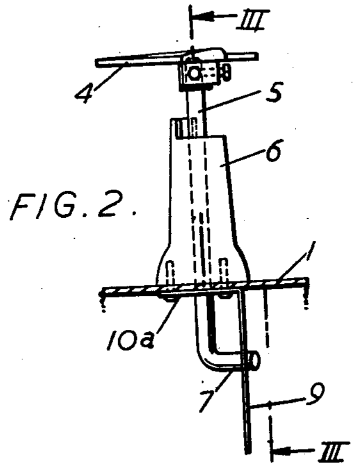
FIGURE 2 is a side elevation to a larger scale of the balance arm of the record changer shown in FIGURE 1 with part of the base plate of the record changer shown in section.
Figures 3, 4:
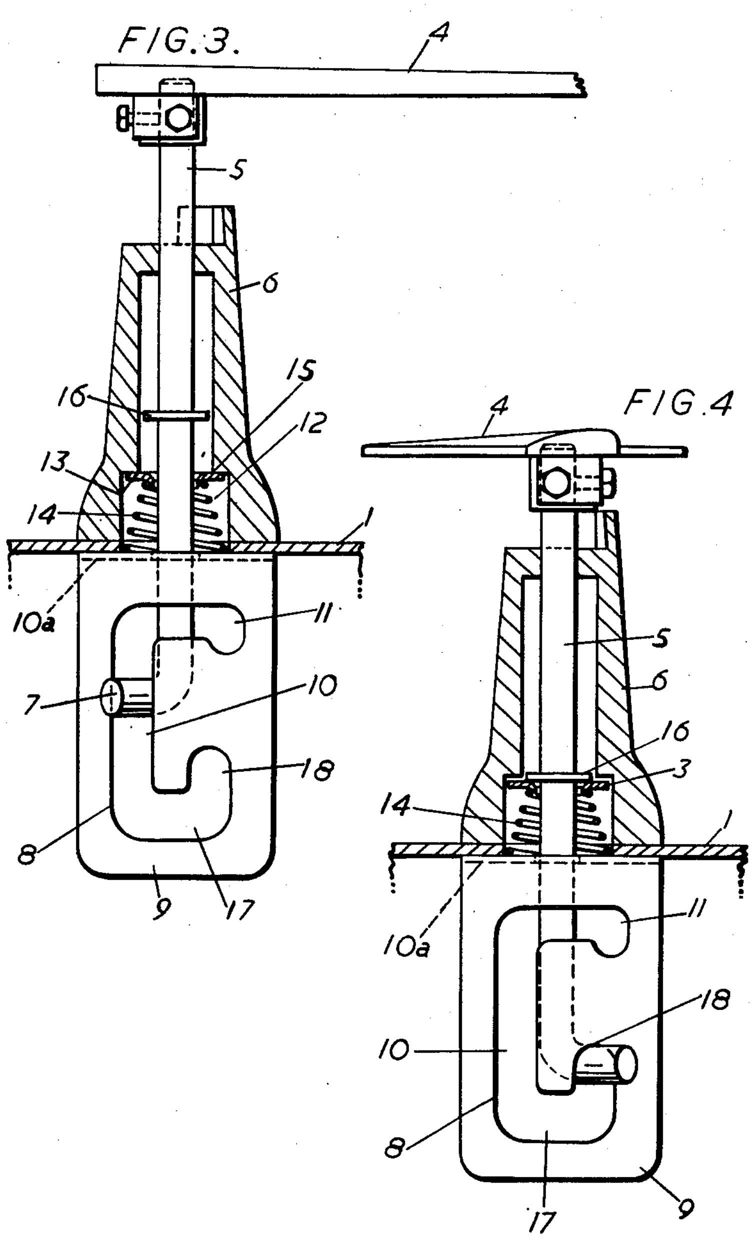
FIGURE 3 is a section as seen in the direction of the arrows on the line III—III in FIGURE 2 to a still larger scale and showing the balance arm in a raised position; and, FIGURE 4 is a section similar to FIGURE 3 but showing the balance arm in a lower fixed position.

As shown in FIGURE 1 of the drawings the record changer has a base plate 1 on which a turntable 2, a pick-up arm 3 and a balance arm 4 are mounted. A record magazine spindle *5a* projects vertically upwards from the center of the turntable 2. As shown in FIGURES 2 to 4 of the drawings the balance arm 4 is fixed to the top of a vertical spindle 5 which is both rotatable and vertically slidable in a support 6. The support 6 is a hollow vertical pillar the bottom of which is fixed to the base plate 1. The bottom of the spindle 5 is bent at right angles to form a lateral projection 7 which engages in a slot 8 in a vertical plate 9 which has a horizontal arm **10*a* fixed to the under-side of the plate 1**.

The slot 8 is substantially C-shaped in elevation as seen most clearly in FIGURES 3 and 4. While the projection 7 is in the vertical part 10 of the slot 8, the balance arm 4 is constrained to move upwards and downwards and cannot rotate about the axis of the spindle 5. To enable records to be placed on the magazine spindle *5a* the balance arm 4 is lifted vertically and is then rotated so that the projection 7 moves into the horizontal arm 11 at the top of the slot 8. This holds the balance arm 4 in its raised and outwardly swung position.

At the bottom of the support 6 there is a circular bore 12 containing a ring 13 which is pushed upwards by a coiled compression spring 14 against a shoulder 15 at the top of the bore 12. The bottom of the spirng 14 presses against the top of the horizontal arm **10*a* of the plate 9 which thus forms an abutment. The spindle 5 has a collar 16 rigidly fixed to it in a position in which, when the balance arm 4** is resting on a record supported on the magazine spindle *5a*, it is above the top of the ring 13.

When the balance arm 4 is to be fixed in position for transport purposes the arm is pushed downwards so that the collar 16 comes into contact with the ring 13 and the ring 13 is pressed downwards against the action of the spring 14. The projection 7 then reaches the left-hand end as seen in FIGURES 3 and 4 of a horizontal arm 17 at the bottom of the slot 8. This horizontal arm forms a recess. The balance arm 4 is then swung sideways so that the spindle 5 is rotated and the projection 7 is moved to the right as seen in FIGURES 3 and 4 along the horizontal arm 17 of the slot 8. The balance arm 4 is then released and the spindle 5 is pressed upwards by the spring 14. This causes the projection 7 to be moved upwards into a vertical part 18 of the slot 8. The projection 7 is held in the part 18 by the spring 14 as shown in FIGURE 4 of the drawings so that the balance arm is prevented both from rotating and from moving vertically upwards and downwards. To release the balance arm again it is pressed downwards and swung so that the projection 7 is moved back into the vertical part 10 of the slot 8. The balance arm is then released so that the projection 7 is moved upwards in the vertical part 10 by the spring 14.

I claim:

1. In an automatic record changer having a base plate, a balance arm, a vertical spindle supporting said balance arm and mounting means fixed on said base plate, said mounting means mounting said spindle for rotational movement and vertical sliding movement, the improvement which comprises a member fixed to said base plate, wall portions on said member defining a substantially vertical guide slot having upper and lower ends and a lateral recess communicating with said lower end, a lateral projection on said spindle, said projection normally extending into said vertical slot, and spring means mounted to urge said spindle upwardly and hold at least the upper edge of said projection above said recess when said projection is within said slot, but said balance arm and with it said spindle and said projection being manually movable downwards agains the action of said spring means and rotatable to bring said projection into said recess, in which position said spring means biasses said spindle upwardly far enough to bring said projection into a cooperative relationship with the top of said recess which holds it against both horizontal and upward motion and thereby locks said balance arm in a fixed position.

2. An automatic record changer, as claimed in claim 1, further comprising a first abutment fixed relatively to said base plate and a second abutment fixed on said spindle and wherein said spring means is a coiled compression spring having upper and lower ends and surrounding said spindle, said lower end abutting against said first abutment and said upper end acting on said second abutment to urge said spindle upwardly when said balance arm, said spindle and said projection are moved manually downwards to move said projection into said recess.

3. An automatic record changer as claimed in claim 2, further comprising a third abutment fixed relatively to said base plate, and a ring surrounding said spindle above said upper end of said spring, said upper end abutting against said ring and normally urging said ring against said third abutment, but said second abutment contacting said ring and moving said ring downwardly away from said third abutment when said spindle is moved manually downwardly.

4. An automatic record changer as claimed in claim 1, wherein said recess comprises a horizontal part and a vertical part, said horizontal part communicating with said slot and leading to said vertical part which extends upwardly from said horizontal part, and said spring means, when said projection is in said vertical part, biassing said projection toward the top thereof.

References Cited in the file of this patent

UNITED STATES PATENTS

| | | |
|---|---|---|
| 649,444 | Good | May 15, 1900 |
| 1,356,293 | Klinger | Oct. 19, 1920 |
| 2,509,202 | Arens | May 30, 1950 |
| 2,637,558 | Fisher | May 5, 1953 |
| 2,831,693 | Zahner | Apr. 22, 1958 |
| 2,869,391 | Brock | Jan. 20, 1959 |
| 2,973,207 | Van Antwerp | Feb. 28, 1961 |